Patented Feb. 21, 1928.

1,659,995

UNITED STATES PATENT OFFICE.

MELVIN DE GROOTE, OF ST. LOUIS, AND WILBUR C. ADAMS, OF UNIVERSITY CITY, MISSOURI, ASSIGNORS TO WM. S. BARNICKEL & COMPANY, OF WEBSTER GROVES, MISSOURI, A CORPORATION OF MISSOURI.

PROCESS FOR BREAKING PETROLEUM EMULSIONS.

No Drawing.     Application filed June 17, 1926.   Serial No. 116,736.

This invention relates to the treatment of emulsions of mineral oil and water, such as petroleum emulsions, for the purpose of separating the oil from the water.

Petroleum emulsions are of the water-in-oil type and comprise fine droplets of naturally occurring waters or brines dispersed in a more or less permanent state throughout the oil which constitutes the continuous phase of the emulsion. They are obtained from producing wells and from the bottom of oil storage tanks and are commonly referred to as "cut oil, roily oil, emulsified oil" and "bottom settlings".

In our pending application for Patent Serial No. 59,954, filed October 1, 1925, we have described a process for breaking or separating petroleum emulsions of the kind referred to, that is distinguished from prior processes used to break such emulsions, in that it contemplates subjecting the emulsions to the action of a treating agent consisting of a mixture comprising a condensation product containing a sulpho-aromatic, soap-forming acid in which the sulphonic group is joined directly to the non-carboxyl end of the aliphatic hydrocarbon chain.

We have discovered that when the treating agent contemplated by the process described in our said pending application for patent is produced on a commercial scale by one of the methods of manufacture described in said application, that a mechanical mixture of allied bodies is obtained, which mixture, in addition to comprising a condensation product containing a sulpho-aromatic, soap-forming acid in which the sulphonic group is joined directly to the non-carboxyl end of the aliphatic hydrocarbon chain, also contains certain complex sulpho-aromatic, soap-forming bodies, which, while lacking the distinguishing characteristic of the treating agent contemplated by our said process, are of equal or greater value as agents for treating petroleum emulsions. Therefore, we desire to protect by this application for patent a process for breaking or separating emulsions of mineral oil and water that is restricted to the use of a treating agent consisting of a mixture comprising a condensation product composed of complex sulpho-aromatic, soap-forming bodies. The expression "condensation product" has been used because the chemical reactions involved in part contemplate dehydration as is illustrated in the formation of an ester or a lactone.

In view of the difficulty of analyzing such complex organic bodies to determine their chemical composition, we will define the treating agent contemplated by our present process by the method employed to produce said agent, as this will enable those skilled in the art to understand and practise our invention, and moreover, will clearly define the metes and bounds of the invention.

The method employed to produce the treating agent used in our present process, broadly stated, consists in subjecting a soap-forming acid in which the carboxyl group is blocked or closed, to the action of an aromatic in the presence of a sulphonating agent, thereby forcing the sulphonated aromatic into the hydrocarbon chain, either at a double bond position, or else by union with an hydroxyl radical. The expression "soap-forming acid in which the carboxyl group is blocked" is herein used to denote that the carboxyl group is so bound as to be chemically inert or inactive and not susceptible to combinations with sulphuric acid or with an aromatic. In general, this is obtained by the replacement of the hydrogen of the carboxyl group by an ester radical or by a halogen. By the expression "soap-forming body" it is meant to denote those organic groups which combine with soluble hydrates to give soap-like detergents. These substances include fatty substances, such as castor oil; resinous substances, such as rosin esters, and naphthenic substances, such as may be found in petroleum sludges. All of these substances are characterized by their ability to combine with alkali to produce soap. They are all characterized by being esters, or substances in which the carboxyl group is blocked.

We prefer to use fatty substances, due to their ease of reaction. Specifically, we prefer to use oleine, which is the glycerid of oleic acid. It is mixed with a molecular proportion of a suitable aromatic hydrocarbon, such as phenol or cresol, and said mixture thereafter subjected to the action of a sulphonating agent. The ester radical of the oleine prevents the sulphonated aromatic compound from entering the carboxyl group of the aliphatic chain, since it already occupies that position. In the sulphonation of an aromatic plus an ester such as castor oil, it is necessary that sulphonation take place below twenty degrees centigrade. In the production of Twitchell agents sulphonation usually takes place at thirty five degrees centigrade, and preferably higher. Such higher temperature splits off the glycerine as glycerine sulphate and liberates the fatty acid. Thus, such a reaction, namley, the one ordinarily employed for the production of sulpho-fatty aromatics, will not serve, but one must rely upon the reaction taking place at a low enough temperature that the carboxyl group remains chemically inactive. Of course, the aliphatic and aromatic esters will vary and some may stand a more elevated temperature without splitting the ester group from the carboxyl, and thus rendering it inactive.

The aromatic substances employed may be one or more of the common coal tar substances, such as benzene, toluene, zylene, cresol, phenol, naphthalene, naphthol, anthracene, tetralin, etc.

The above reactions produce a condensation product of an acidic character, and in using such products, we prefer to use the water-soluble salts obtained by neutralization of the acidic material by means of caustic soda, potash or ammonia. However, the water-insoluble salts, such as calcium or magnesium salts, or the esters, such as the methyl or ethyl ester, can be employed. These materials can be used directly in undiluted form or in dilute form, and when diluted, water or oil is the most desirable solvent to use.

In practising our process the treating agent, consisting of a substance of the character above described, is brought into contact with an emulsion, either by introducing the treating agent into a well in which a petroleum emulsion is being produced; introducing the treating agent into a conduit through which a petroleum emulsion is flowing; introducing the treating agent into a tank in which a petroleum emulsion is stored, or introducing the treating agent into a container that holds the sludge obtained from the bottom of an oil storage tank. The treating agent can even be introduced into a producing well in such a way that it will become mixed with water or oil that is emerging from the ground before said water and oil enter the barrel of the well pump or the tubing up through which said water and oil flow to the surface of the ground. After any of the various treatments above referred to the emulsion is allowed to stand in a quiescent state at a suitable temperature, so as to permit the water or brine to separate from the oil, or it may be passed through a variety of apparatus, such as hay tanks, gun barrels, etc., such as are now commonly used for "breaking" petroleum emulsions. It may even be passed through a heating apparatus, a centrifugal or electrical dehydrator, or an emulsifying device, with or without the addition of water to the emulsion, or it may be subjected to action by a combination of two or more of the devices above referred to.

Having thus described our invention, what we claim as new and desire to secure by Letters Patent is:

1. A process for breaking or separating petroleum emulsions, characterized by subjecting the emulsion to the action of a treating agent consisting of a mixture comprising a condensation product containing a sulpho-aromatic, soap-forming acid and other complex bodies, produced by subjecting an organic soap-forming acid in which the carboxyl group is blocked and non-reactive, to the action of an aromatic in the presence of a sulphonating agent.

2. A process for breaking or separating petroleum emulsions, characterized by subjecting the emulsion to the action of a treating agent consisting of a mixture comprising a condensation product containing a sulpho-aromatic, soap-forming acid and other complex bodies, produced by subjecting a fatty acid in which the carboxyl group is blocked and non-reactive, to the action of an aromatic in the presence of a sulphonating agent.

3. A process for breaking or separating petroleum emulsions, characterized by subjecting the emulsion to the action of a treating agent consisting of a mixture comprising a condensation product containing the salts of a sulpho-aromatic, soap-forming acid and other complex bodies, produced by subjecting a fatty acid in which the carboxyl group is blocked and non-reactive, to the action of an aromatic in the presence of a sulphonating agent.

4. A process for breaking or separating petroleum emulsions, characterized by subjecting the emulsion to the action of a treating agent consisting of a mixture comprising a condensation product containing the water-soluble salts of a sulpho-aromatic, soap-forming acid and other complex bodies, produced by subjecting a fatty acid in which the carboxyl group is blocked and non-reactive, to the action of an aromatic in the presence of a sulphonating agent.

5. A process for breaking or separating petroleum emulsions, characterized by subjecting the emulsion to the action of a treating agent consisting of a mixture comprising a condensation product containing the ammonium salts of a sulpho-aromatic, soap-forming acid and other complex bodies, produced by subjecting a fatty acid in which the carboxyl group is blocked and non-reactive, to the action of an aromatic in the presence of a sulphonating agent.

MELVIN DE GROOTE.
WILBUR C. ADAMS.